J. C. McMANUS.
PEDAL LOCK.
APPLICATION FILED SEPT. 13, 1920.

1,395,966. Patented Nov. 1, 1921.
2 SHEETS—SHEET 1.

J.C. McManus
INVENTOR

BY Victor J. Evans
ATTORNEY

J. C. McMANUS.
PEDAL LOCK.
APPLICATION FILED SEPT. 13, 1920.
1,395,966.
Patented Nov. 1, 1921.
2 SHEETS—SHEET 2.
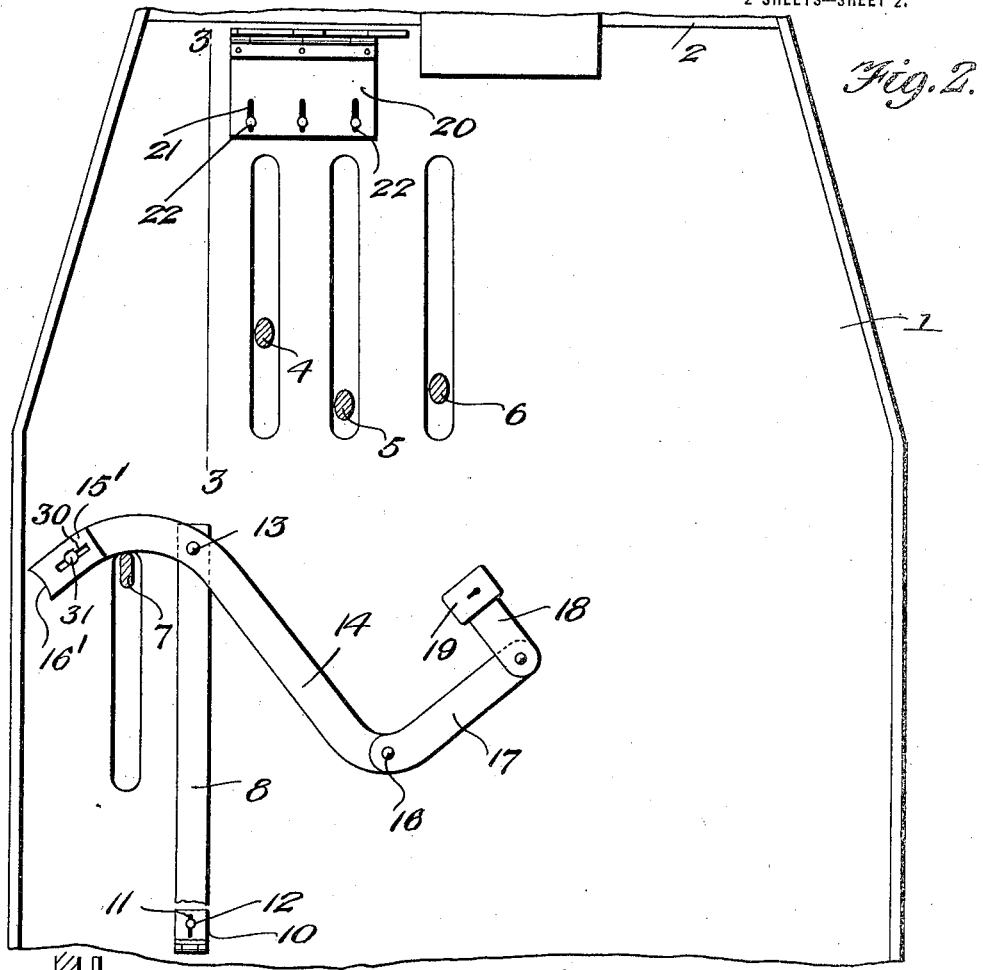
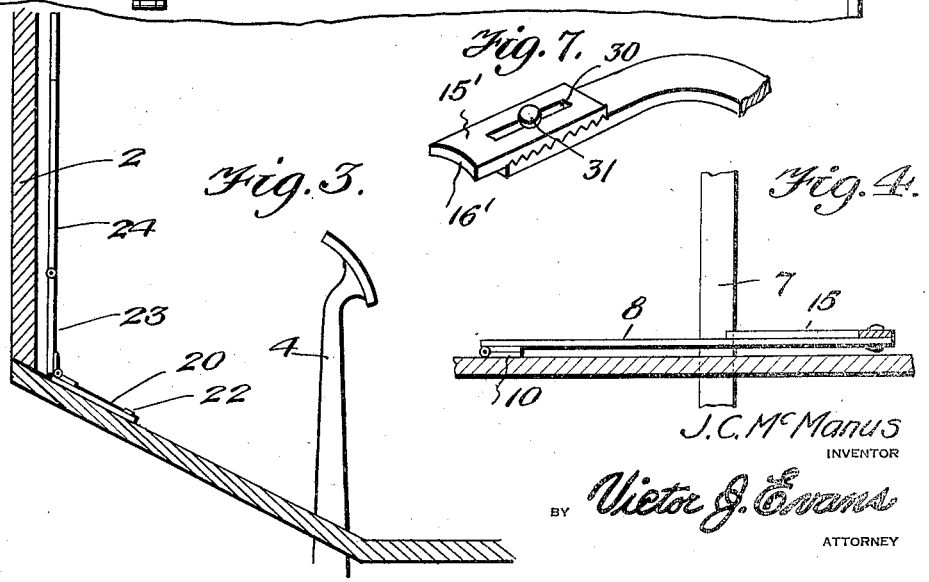
J. C. McManus
INVENTOR
BY Victor J. Evans
ATTORNEY

UNITED STATES PATENT OFFICE.

JOSEPH C. McMANUS, OF JACKSONVILLE, FLORIDA.

PEDAL-LOCK.

1,395,966.  Specification of Letters Patent.  Patented Nov. 1, 1921.

Application filed September 13, 1920. Serial No. 409,866.

*To all whom it may concern:*

Be it known that I, JOSEPH C. MCMANUS, a citizen of the United States, residing at Jacksonville, in the county of Duval and State of Florida, have invented new and useful Improvements in Pedal-Locks, of which the following is a specification.

My present invention has reference to a means for preventing the starting and operation of an automobile by unauthorized persons.

The object is the construction and cooperative arrangement of simple mechanism designed, when brought to one position to offer obstructing means for the pedals and for the brake lever of an automobile to prevent the operation of these elements, and when brought to another position to be folded against the dash and front board of the machine so as to offer no obstruction to the proper operation of the pedals, lever, etc.

A further object is the production of a combined pedal and brake locking means that constitute hinged and pivoted elements which are adjustably secured on the foot board at the front of the machine, whereby the device may be successfully employed upon varying sizes of machines, the members constituting the improvement, when brought to operative position being locked, the key for the lock being carried by the owner or operator of the machine, and when in inoperative position the said members are designed to be folded respectively against the dash and front seat board of the machine and held thereagainst in any desired or preferred manner.

The foregoing, and other objects which will appear as the nature of the invention is better understood, may be accomplished by a construction, combination and operative arrangement of parts, such as is disclosed by the drawings accompanying and forming part of this application.

In the drawings:—

Fig. 2 is a similar view but showing the parts constituting the improvement in non-obstructing position, the pedal obstructing member being folded against the dash of the machine, but the brake obstructing member being arranged on the floor of the machine previous to the folding thereof against the front seat board.

Fig. 3 is a sectional view approximately on the line 3—3 of Fig. 2.

Fig. 4 is a sectional view approximately on the line 4—4 of Fig. 1.

Fig. 7 is a fragmentary perspective view of the end of the arm that provides the obstruction element for the emergency brake lever.

Figure 1:
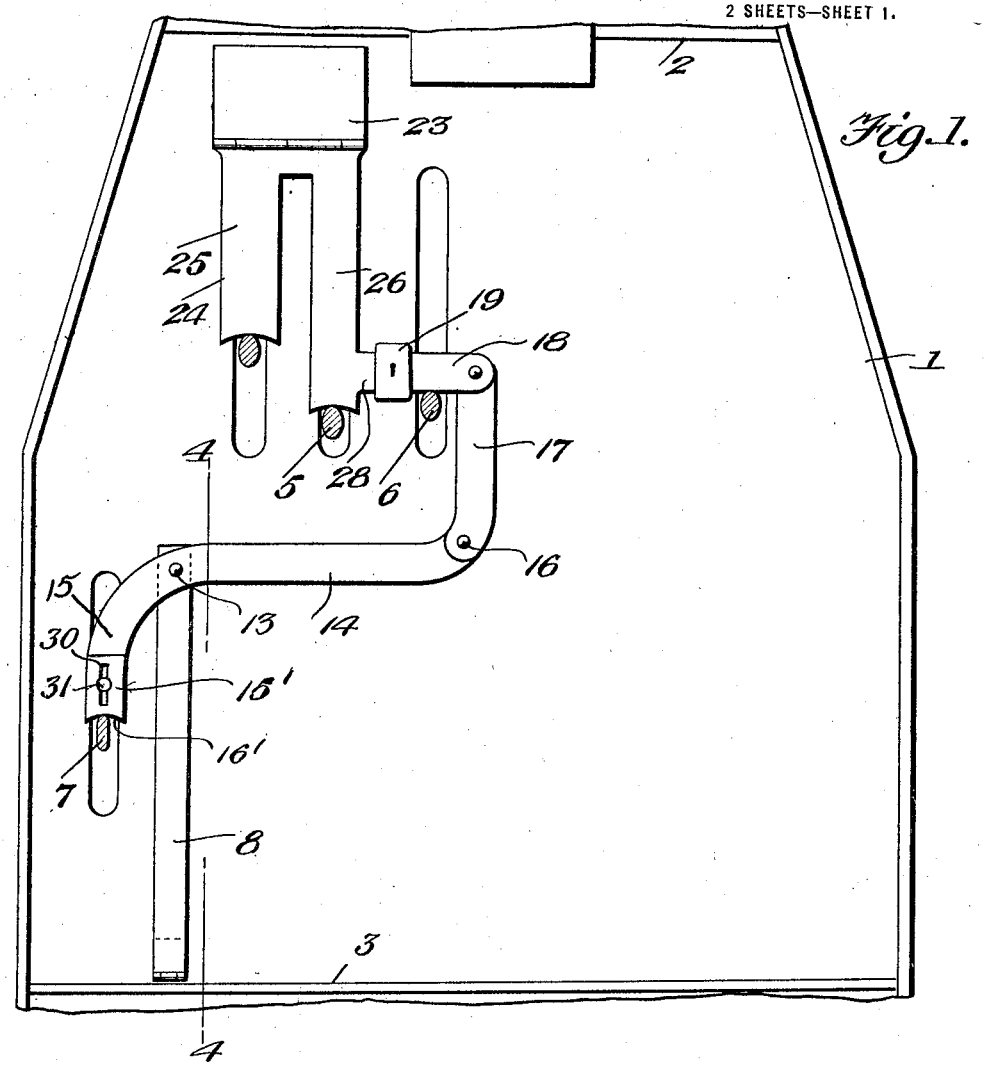
Figure 1 is a plan view of the forward portion of an automobile body, showing the improvement in operative position, the pedals and brake lever being in section.
Figure 5:
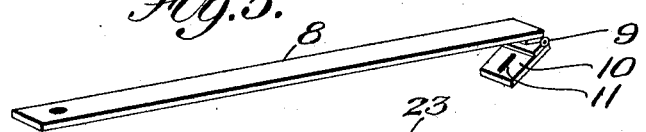
Fig. 5 is a perspective view of the hinged strap to which the brake lever obstructing member is pivotally connected.
Figure 6:
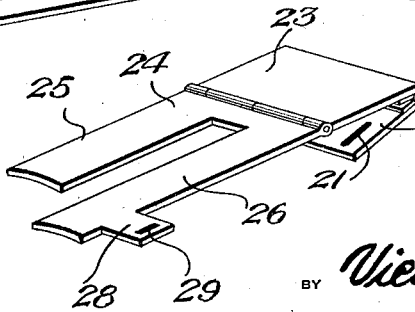
Fig. 6 is a perspective view of the obstructing means for speed and reverse clutch levers.

Referring now to the drawings in detail, the forward portion of any ordinary construction of automobiles is indicated by the numeral 1, the dash by the numeral 2, and the front board for the front seat by the numeral 3.

For the sake of convenience, my improvement is illustrated in connection with the Ford make of automobiles, but it will be apparent that as the nature of the improvement is more fully understood that the same is applicable to any other make of machine.

Arranged for movement in the usual elongated slots are the high and low speed clutch lever 4, the reverse lever 5, the foot brake pedal lever 6, and the emergency hand brake lever 7.

In a line parallel to the slot through which the emergency brake lever extends, I secure a plate 8. The plate has its end, nearest the front seat hingedly connected, as at 9 to a plate 10. The plate 10 has an elongated slot 11 therethrough, and through this slot passes a securing element 12 that, of course, enters the floor board. In this manner the plate may be adjustably connected to the machine, and also in this manner, the plate is permitted to be swung against the board for the front seat.

Pivotally secured, as at 13 to the plate is an arm 14. The arm has an angle end 15 which, when the device is brought to the position illustrated in Fig. 1, is designed to be arranged over the slot through which the emergency brake lever passes and to have its end, which is preferably concaved, in the path of contact with the said emergency brake lever. The opposite end of the arm has pivotally secured thereto, as at 16 an extension 17 which is designed to be arranged angularly with respect to the said arm and which has at its outer end a pivoted link 18. The link 18 carries a lock casing 19 having works therein that are operated by a removable key. The link 18, when swung to the position illustrated in Fig. 1 of the drawings, serves as an obstructing element for the brake pedal lever.

To the foot board directly forward of the slots in which the clutch levers 4 and 5 are arranged, is a plate 20. This plate is provided with a plurality of elongated slots 21 through which pass headed securing elements 22 that enter the foot board and that permit of the longitudinal adjustment of the plate 20 on the said foot board. The plate 20 is really in the nature of a hinged butt, having its end near the dash 2 provided with knuckles which receive therebetween similar knuckles formed on the second hinged butt 23. Through the knuckles pass the usual pintle. The butt 23 has both of its ends provided with knuckles, the outer series of which having disposed therebetween, knuckles formed on the ends of a plate 24, a pintle passing through the said knuckles. The plate 24 is centrally slotted to provide parallel arms 25 and 26 respectively. The ends of these arms are preferably rounded inwardly, and the arm 26 is of a greater length than the arm 25. When the hinged elements, above described, are spread to the position illustrated in Fig. 1 of the drawings, the arms 25 and 26 will have their rounded ends in a position to contact with the levers 4 and 5.

The arm 26 has on its outer edge a lateral extension 28 which is notched, as at 29. This notched extension is in the nature of a hasp which is designed to be received in the lock casing, and the locking means in the said casing when actuated bring the bolt thereof through the notch in the said staple member, thus locking the arm 14 to the hinged portion of the device, and thus effectively preventing the operation of any of the clutch pedals and the emergency brake lever.

When the lock is released, the arm 14 may be swung with the plate 8 on its hinge 9 against the front seat board 3, and retained thereagainst in any desired or preferred manner. In a like manner, the hinged members may be swung to permit of the plate 24 resting against the dash, and suitable catch means may be provided for sustaining the same in such position.

The outer or free angle end 15 of the arm 14 preferably has its upper face serrated, the said serrations being engaged by teeth formed on a comparatively short plate 15'. This plate has its outer end concaved, as at 16' to engage with the brake lever 7 when the device is in operative position.

The plate 15' has an elongated slot 30 extending longitudinally therethrough, and the numeral 31 designates a headed threaded element that has its shank passing through the slot and engaging a threaded opening in the arm 14. The head of the element 31 binding on the plate 15' holds the teeth on the under face thereof in engagement with the teeth or serrations on the arm 14. The plate 15' thus serves as an adjustable means for the arm 14, whereby the brake lever 7 on different sizes and styles of cars may be properly engaged.

Having thus described the invention, what I claim, is:—

1. In combination with an automobile having control pedal levers and an emergency brake lever; of obstructing means for the clutch levers and brake lever, comprising a plate hingedly secured to the foot board of the machine adjacent to the front seat thereof, an arm pivoted to the plate having an angle end designed when the said arm is swung to one position to offer an obstruction for the emergency brake lever, hinged sections one of which being fixed to the foot board adjacent to the dash of the machine, and including arms designed, when the members are spread to be arranged in the path of contact with two of the control levers, means carried by the first mentioned arm and one of the last mentioned arms for locking the same together, and said means also providing an obstructing element for the remaining clutch levers.

2. In combination with an automobile having control pedal levers and an emergency brake lever; of obstructing means for said levers, including a plate having a hinged section at the end thereof which is slotted and which is secured to the foot board of the machine adjacent to the front seat thereof, an arm having an angle end pivoted to the plate and designed, when swung to one position to obstruct the movement of the emergency brake lever, an extension pivoted to the straight end of the arm, a link pivotally connected to the said extension carrying a lock casing, a slotted butt having securing means passing through the slots thereof for sustaining said butt on the foot board adjacent to the dash, a second butt hingedly connected to the first mentioned butt, a plate hingedly connected to the last mentioned butt, said plate having parallel arms designed, when the hinged sections are spread to serve as obstructing elements for two of the pedal control levers, an extension constituting a hasp on one of the arms designed to be received in the lock casing and to be locked to the link, and the said link, when in such position providing an obstructing element for the remaining control pedal lever.

3. In combination with an automobile having control pedal levers and an emergency brake lever; of obstructing means for the clutch levers, and brake lever, comprising a plate hingedly secured to the foot board of the machine adjacent to the front seat thereof, an arm pivoted to the plate having an angle end, a removable and adjustable plate on said end designed, when the arm is swung to one position to offer an obstruction for the emergency brake lever, hinged sections one of which being fixed to the foot board adjacent to the dash of the machine, and including arms designed, when the members are spread to be arranged in the path of contact with two of the pedal levers, means carried by the first mentioned arm and one of the last mentioned arms for locking the arms together, and said means also providing an obstructing element for the remaining clutch levers.

In testimony whereof I affix my signature.

JOSEPH C. McMANUS.